United States Patent [19]

Hanson et al.

[11] Patent Number: 5,456,088
[45] Date of Patent: Oct. 10, 1995

[54] REFRIGERATION UNIT AND METHOD OF OPERATING SAME

[75] Inventors: Jay L. Hanson, Bloomington; James E. Nixon, Woodbury; Doyle G. Herrig, Elko; Gerald J. Ladendorf, Bloomington, all of Minn.

[73] Assignee: Thermo King Corporation, Minneapolis, Minn.

[21] Appl. No.: 152,649

[22] Filed: Nov. 12, 1993

[51] Int. Cl.$^6$ ............................................. F25B 49/00
[52] U.S. Cl. ............................................. 62/229; 62/157
[58] Field of Search ............................ 62/229, 157, 158, 62/231, 129, 126, 226, 227, 130

[56] References Cited

U.S. PATENT DOCUMENTS

| | | | |
|---|---|---|---|
| 4,283,921 | 8/1981 | Prosky | 62/130 X |
| 4,419,866 | 12/1983 | Howland . | |
| 4,493,191 | 1/1985 | Hanson | 62/229 X |
| 4,850,198 | 7/1989 | Helt et al. | 62/157 X |
| 4,878,465 | 11/1989 | Hanson et al. . | |
| 4,913,932 | 4/1990 | Gustafson et al. . | |
| 5,123,251 | 6/1992 | Hanson . | |
| 5,140,826 | 8/1992 | Hanson et al. . | |
| 5,197,650 | 3/1993 | Hanson et al. . | |

*Primary Examiner*—Harry B. Tanner
*Attorney, Agent, or Firm*—M. G. Panian

[57] ABSTRACT

A refrigeration unit, and method of operating same, having a compressor driven by a prime mover. The prime mover is selectively operable in either a continuous mode which includes heating and cooling cycles, or in start-stop cycling mode which includes cooling and null cycles, to control the temperature of a conditioned space relative to a predetermined set point temperature. In one embodiment, the cycle mode is operable only when the set point temperature is in a predetermined temperature range, the limits of which are selectable. The prime mover is operated in the continuous mode, notwithstanding the selection of the cycle mode, when the set point temperature is not within the temperature range authorized for cycle operation. In other embodiments, the time duration and the upper temperature limit of the null cycle are both selectable, with an automatic override of the selected upper temperature limit being provided when the conditioned space contains a frozen load and the selected upper temperature limit of the null cycle would allow the temperature of the conditioned space to rise above a predetermined value. In still other embodiments, in which the prime move includes an engine and a battery, the minimum battery voltage which will re-start the engine to terminate a null cycle, and the minimum battery charging current which will enable the engine to be stopped to initiate a null cycle, are both selectable.

6 Claims, 5 Drawing Sheets

REFRIGERATION UNIT AND METHOD OF OPERATING SAME

TECHNICAL FIELD

The invention relates in general to refrigeration units, such as transport refrigeration units, and methods of operating same, and more specifically to refrigeration units which are selectively operable in continuous and start-stop cycle modes.

BACKGROUND ART

Certain types of refrigeration units, such as transport refrigeration units suitable for conditioning cargo spaces of trucks and trailers, often have a prime mover for the refrigerant compressor which includes an internal combustion engine. Such refrigeration units are often operable in a selected one of two different operating modes, as selected by an operating mode switch. When the operating mode switch is in a first position, the prime mover is operated continuously, with the refrigeration unit cycling between cooling and heating cycles once a selected set point temperature in an associated conditioned space has been reached.

When the operating mode switch is in a second position, the prime mover is operated in a start-stop cycle mode, in which the prime mover is operated until the temperature of the conditioned space is driven down to a selected set point temperature, at which point the prime mover is stopped and the refrigeration unit enters a null cycle, if the battery charging current is below some predetermined value, and the engine coolant temperature is above a predetermined value. When the temperature of the conditioned space rises to some predetermined value relative to the set point temperature, the prime mover is started to again drive the temperature of the conditioned space down to the set point temperature.

If the ambient temperature is close to the selected set point temperature, the null cycle can last indefinitely, at least until the battery voltage drops to some predetermined value, or the temperature of the engine coolant drops to a predetermined value, with either of these events starting the prime mover, even though the temperature of the conditioned space is within the upper and lower temperature limits of the null temperature zone.

Some loads to be conditioned in the conditioned space require continuous air flow, some require at least periodic air flow, and others do not require any minimum amount of air flow. It would be desirable, and it is an object of the present invention, to give the operator of a refrigeration unit more control of air flow during the cycle operating mode, so the air flow may be more closely matched to the requirements of a specific load.

The minimum voltage and charging current values are compromise values selected to accommodate the average battery over its useful operating life, over the complete range of ambient temperature conditions which may be encountered during use of the refrigerant unit. It would be desirable, and it is another object of the invention, to give the operator of the refrigeration unit more control over when an engine prime mover will be automatically started because of the battery voltage, and when an engine prime mover will be prevented from stopping because of the battery charging current.

SUMMARY OF THE INVENTION

Briefly, the present invention relates to new and improved refrigeration units, and methods of operating same, which units are selectively operable in either a continuous mode or in a cycle mode. The invention allows an operator to more closely tailor air flow to the air flow requirements of each type of load carried in the conditioned space while the unit is operating in cycle mode; and, the invention allows the operator to control certain starting and stopping parameters of an engine prime mover when the cycle mode is selected, such as according to the ambient temperature and according to the age and/or condition of the battery used to re-start the engine.

More specifically, in a first embodiment of the invention the method includes the steps of selecting an operating mode from the continuous and cycle operating modes, selecting a temperature range in which the cycle mode is authorized, selecting the set point temperature for the conditioned space, comparing the selected set point temperature with the selected authorized temperature range, and running the unit in the continuous mode when the comparison step finds that the selected set point temperature is not within the authorized temperature range, without regard to the operating mode actually selected.

The invention also includes a refrigeration unit having a compressor driven by a prime mover in one of first and second selectable operating modes, with the first operating mode being a continuous mode which includes cooling and heating cycles, and with the second operating mode being a cycle mode which includes cooling and null cycles, to control the temperature of a conditioned space relative to a predetermined set point temperature. The apparatus includes means for selecting an operating mode from the continuous and cycle operating modes, means for selecting a temperature range in which the cycle mode is authorized, means for selecting the set point temperature for the conditioned space, comparator means for comparing the selected set point temperature with the selected authorized temperature range, and means for running the unit in the continuous mode when the comparator means finds that the selected set point temperature is not within the authorized temperature range, without regard to the operating mode selected.

In other method and apparatus embodiments of the invention, the upper temperature limit of the null cycle of the cycle mode is selectable by the operator according to the type of load being conditioned; the duration of a null cycle may be time limited by the operator, with the time limit value also being selectable by the operator to insure a predetermined minimum average air flow which matches the air flow requirements of the load being conditioned; the battery voltage which will result in re-starting of an engine prime mover is selectable by the operator, with the ambient temperature and condition of the battery in mind; and, the battery charging current level, which will result in preventing stopping of an engine prime mover when the charging current has not dropped to this level, is also selectable by the operator, again with the ambient temperature and condition of the battery in mind.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

U.S. Pat. Nos. 4,419,866; 4,878,465; 5,123,251; 5,140,826; and 5,197,650, which are assigned to the same assignee as the present application, all disclose apparatus for operating a transport refrigeration unit in the cycle mode. In order to limit the length and complexity of this application, these U.S. Patents are hereby incorporated into the specification of the present application by reference.

Figure 1:
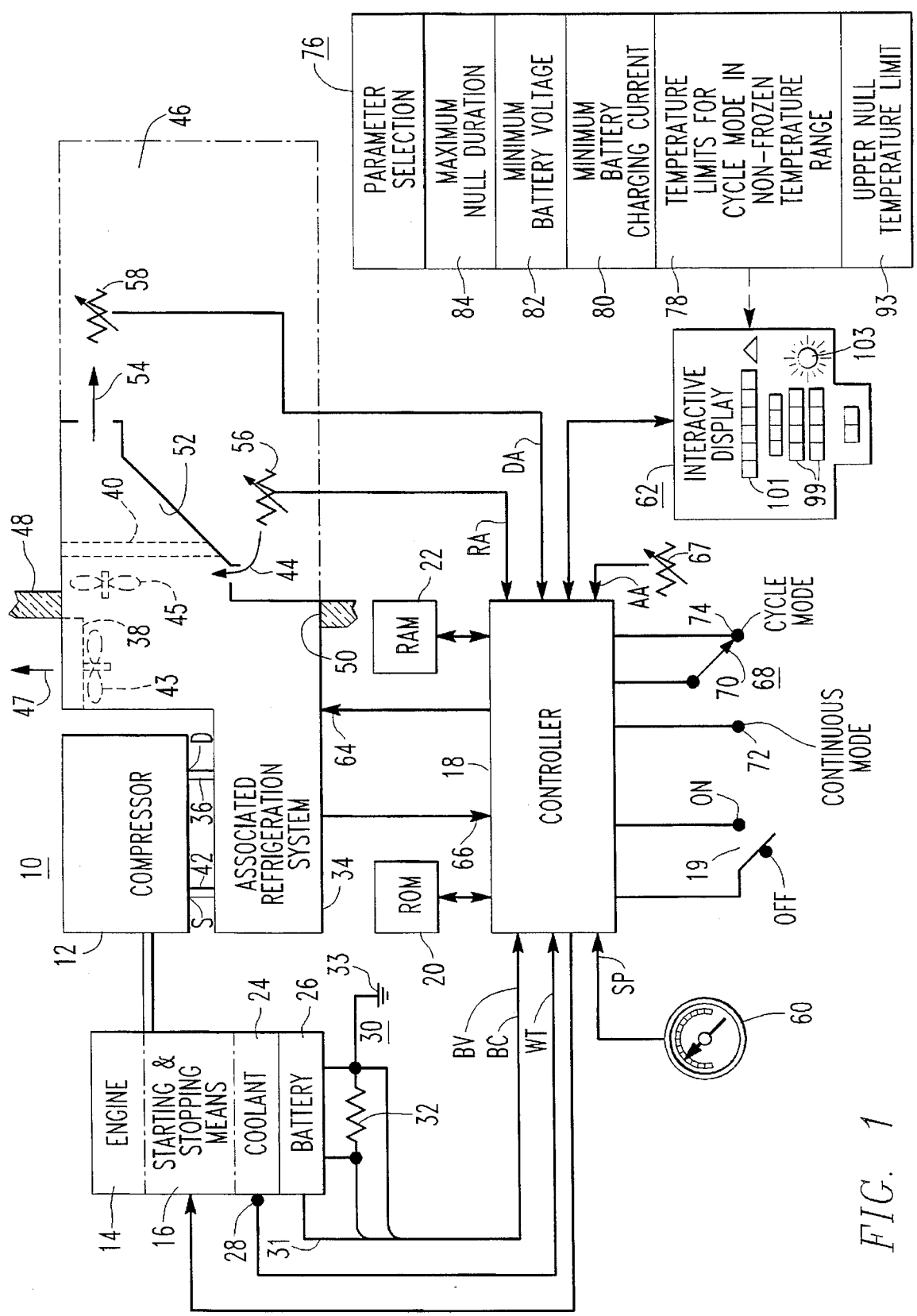
FIG. 1 is a partially block and partially schematic diagram which illustrates a refrigeration unit constructed according to the teachings of the invention.

Referring now to the drawings, and to FIG. 1 in particular, there is shown a refrigeration unit 10 constructed according to the teachings of the invention. Refrigeration unit 10 is preferably a transport refrigeration unit, such as those used on straight trucks, trailers of a tractor-trailer combination, and containers; or, any type of refrigeration unit in which a refrigerant compressor 12 has a prime mover which includes an internal combustion engine 14, such as a diesel engine.

Figure 3:
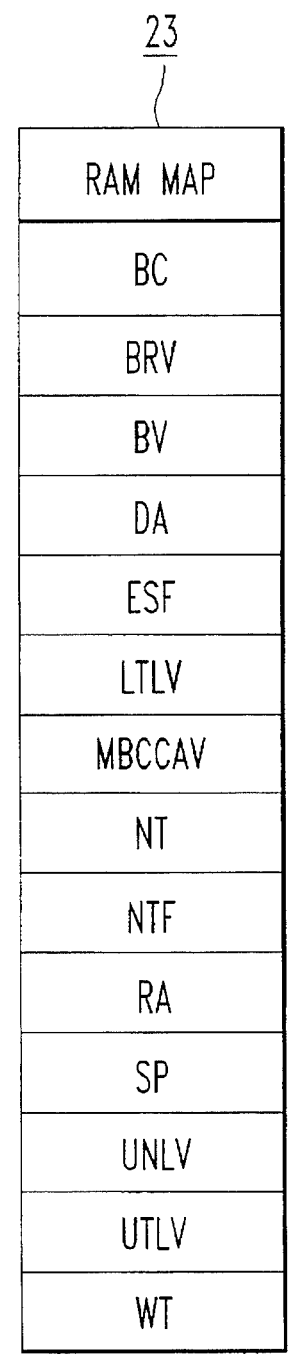
FIG. 3 is a RAM map which lists certain flags, timers, sensor values, selected operating parameters, and other program variables, which are utilized in the program of FIG. 2, and other programs of the invention.

Engine 14 includes starting and stopping means 16, such as is shown in detail in the incorporated U.S. Patents. The starting and stopping means 16 is under the control of a temperature controller 18, which is preferably microprocessor based, having an on-off switch 19, a read-only memory (ROM) 20 for storing application programs, and a random-access memory (RAM) 22 for storing sensor values, flags, timers, and other program variables generated during the running of programs stored in ROM 20. FIG. 3 is a RAM map 23 showing variables used in the programs of the invention.

Engine 14, which is cooled by a suitable coolant 24, is started by a battery 26. A temperature sensor 28 provides a signal WT for controller 18 in response to the temperature of engine coolant 24; and, an electrical control circuit 30, which includes an alternator or generator (not shown), a battery voltage conductor 31, a shunt 32, and electrical ground 33. Electrical control circuit provides signals BV and BC for controller 18. Signal BV is responsive to the output voltage of battery 26 when engine 14 is stopped, and a signal BC is responsive to the battery charging current when engine 14 is running.

Compressor 12 provides hot refrigerant gas for an associated refrigeration system 34, via a discharge port D and a hot gas line 36. Hot refrigerant gas is condensed in a condenser coil 38, expanded in a suitable expansion device, such as a thermostatic expansion valve (not shown), evaporated in an evaporator coil 40, and refrigerant gas is returned to a suction port S of compressor 12 via a suction line 42. Condenser coil 38 is cooled via condenser blower or fan means 43, drawing in ambient air through condenser coil 38 and discharging the warmed air, indicated at 47, back to the ambient.

Air 44, hereinafter called return air 44, is drawn by evaporator blower or fan means 45 from a space 46 to be conditioned by refrigeration unit 10. An insulated wall 48 of conditioned spacer 46 includes an opening 50 therein for receiving a portion of the associated refrigeration system 34 which includes an evaporator plenum 52 into which the return air 44 is drawn. Return air 44 is conditioned by evaporator coil 40, and evaporator fan means 45 discharges conditioned air 54, hereinafter called discharge air 54, back into conditioned space 46. A return air temperature sensor 56 provides a signal RA for controller 18 responsive to the temperature of return air 44, and a discharge air temperature sensor 58 provides a signal DA for controller 18 responsive to the temperature of the discharge air 54.

Controller 18 controls the temperature of conditioned space relative to a selected set point temperature SP, with the set point temperature SP being selected by a set point temperature selector 60, or via an interactive program which is run in connection with an interactive display 62, as desired. Controller 18 provides signals, shown generally at 64 for operating predetermined controllable refrigeration path flow valves associated with refrigeration system 34, and controller 18 receives unit monitoring signals, shown generally at 66, from electrical control associated with refrigeration system 34. Suitable refrigeration flow paths, controllable valves, monitoring signals, and the like, are all shown in detail in the incorporated U.S. Patents. Temperature controller 18 controls the temperature of conditioned space 46 relative to the selected set point temperature SP, using various signals such as signals RA, DA, SP, and a signal AA from an ambient air temperature sensor 67. An example of a suitable temperature control algorithm is described in detail in U.S. Pat. No. 4,918,932, which is assigned to the same assignee as the present application, but other temperature control algorithms may be used.

Figure 6:
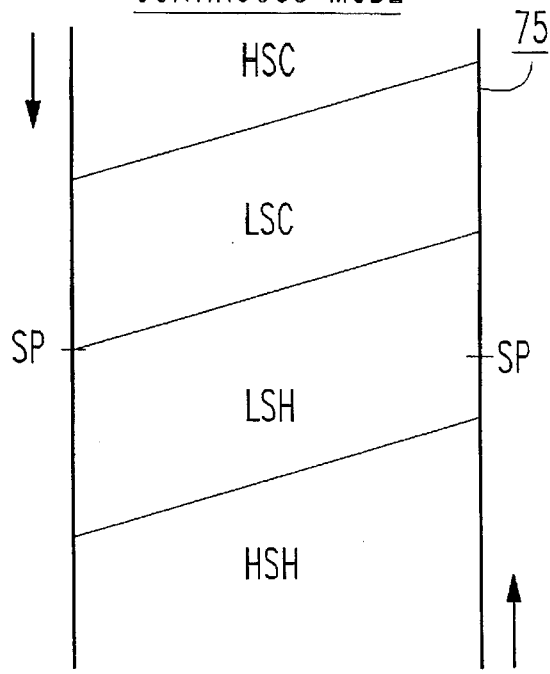
FIG. 6 is a control algorithm which sets forth the operation of the refrigeration unit shown in FIG. 1 in the continuous operating mode.

Controller 18 also includes inputs from an operating mode selector switch 68 which includes a selector element 70 and first and second positions 72 and 74. When switch selector element 70 is in the first position 72, a continuous operating mode is requested for refrigeration unit 10. The continuous operating mode includes running engine 14 continuously. In the continuous operating mode, controller 18 switches the operation of refrigeration unit 10 between a low speed cooling cycle (LSC) and a low speed heating cycle (LSH), once the temperature of conditioned space 46 has been pulled down to the set point temperature SP selected by selector 60. In a heating cycle, instead of directing hot refrigerant gas through condenser coil 38, it may be connected directly to evaporator coil 40, to provide a hot gas heating cycle. Electrical resistors may alternatively be used to implement a heating cycle. A control algorithm 75 for operating refrigeration unit in the continuous mode is shown in FIG. 6.

Figure 5:
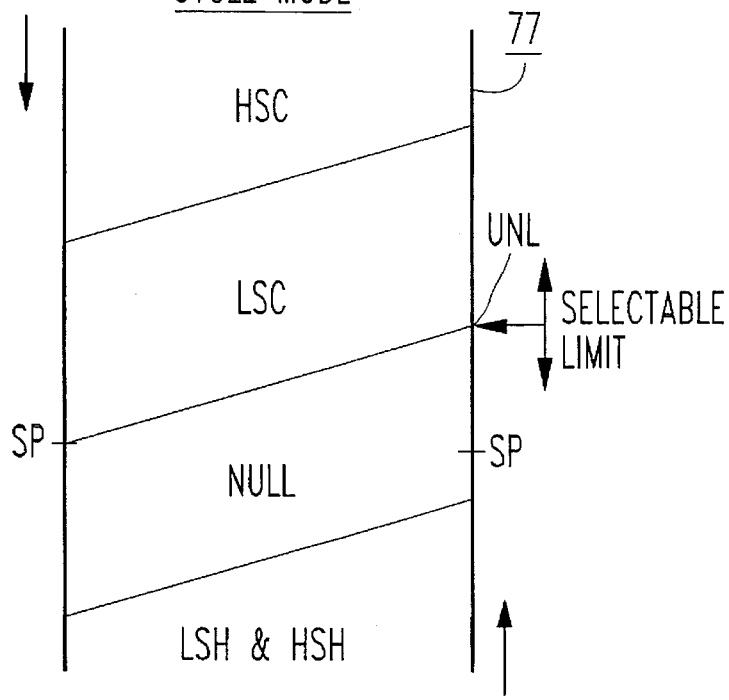
FIG. 5 is a control algorithm which sets forth the operation of the refrigeration unit shown in FIG. 1 in the start-stop cycling operating mode.

When operating mode selector switch 68 is in the second position 74, as illustrated in FIG. 1, a cycle mode is requested. In the cycle mode, controller 18 runs engine 14 in high speed cool (HSC) and low speed cool (LSC) until the desired set point temperature SP is reached. High speed cool (HSC) is normally only required during initial temperature pull down of conditioned space 46. Controller 18 then stops engine 14, when predetermined parameters associated with engine 14 are satisfied, and a null cycle is initiated. Controller 18 terminates the null cycle when the temperature of conditioned space goes outside the upper or lower temperature limits of the null temperature band, by starting engine 14. The null cycle is also terminated in response to certain parameters associated with engine 14. FIG. 5 illustrates a control algorithm 77 which may be used for implementing the cycle mode. As will be hereinafter explained, the invention may override the selection of the cycle mode position 74, running refrigeration unit 10 in continuous mode.

Figure 2:
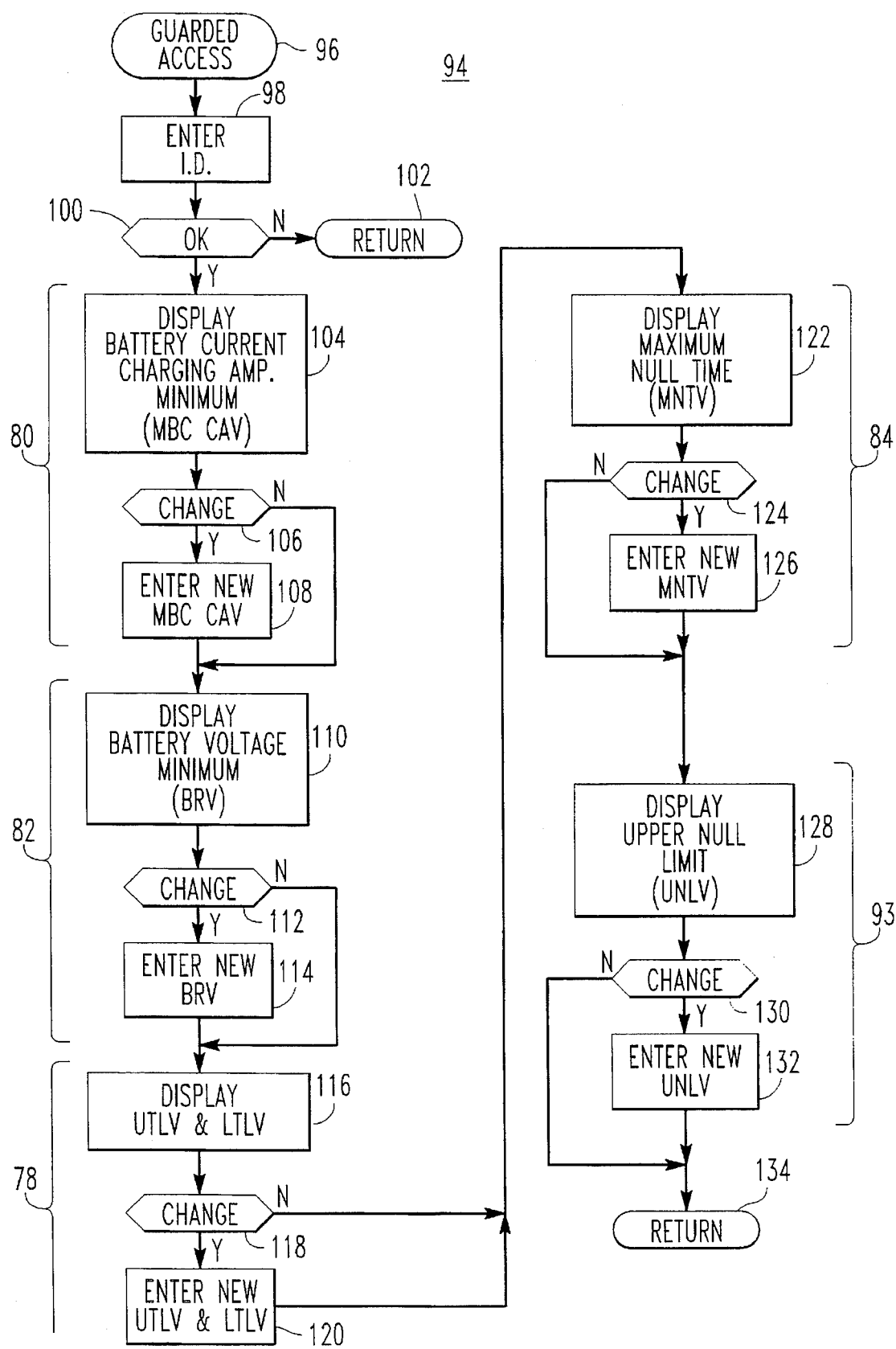
FIG. 2 is a flow diagram of a program which implements an interactive aspect of the invention in which authorized personnel may tailer the operation of the refrigeration unit when it is operating in the cycle mode, to optimize operation of the refrigeration unit for the specific load being carried in the conditioned space, according to the air circulation requirements of the load, as well as to the existing ambient and engine starting battery conditions.

The invention includes parameter selection means 76, which may be a hard wired parameter selector, but which is preferably implemented by utilizing an interactive program shown in FIG. 2 in conjunction with display 62. Display 62 is preferably an interactive display, such as shown and described in the hereinbefore mentioned U.S. Pat. No. 5,123,251.

Most fresh loads require continuous air flow, but some do not. The invention makes it possible for an authorized user of refrigeration unit 10 to define a temperature range in the non-frozen temperature range of set point control, which, when the set point SP is in this range, will enable cycle mode to be selected and implemented. Any selection of cycle mode when the set point SP is in the non-frozen range, but not in the cycle mode preauthorized range, will be ignored, with controller 18 running refrigeration unit 10 in continuous mode 72, notwithstanding the selection of cycle mode 74 by selector switch 68.

Figures 1A, 4B:
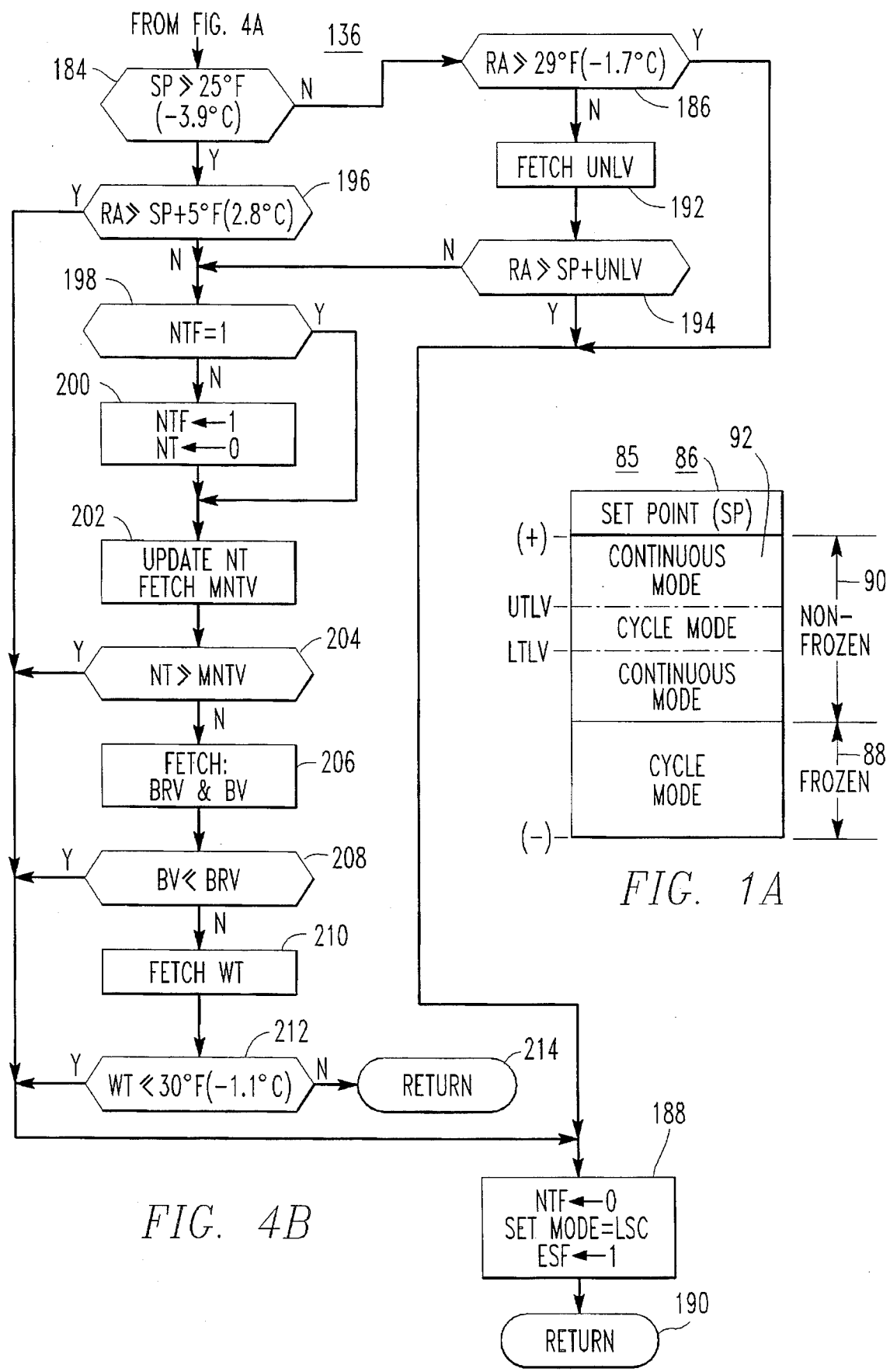
FIG. 1A illustrates means for dividing the controllable set point temperature range of the refrigeration unit shown in FIG. 1 into frozen and non-frozen temperature ranges, and further illustrating the restriction of cycle mode in the non-frozen temperature range to a pre-selected temperature range.
FIGS. 4A and 4B may be combined to provide a flow diagram of a program which is run periodically to implement the new and improved cycle operating modes of the invention.

Parameter selection means 76 includes means 78 for selecting upper and lower temperature limit values UTLV and LTLV, respectively, in a non-frozen portion of the controllable set point temperature range. FIG. 1A illustrates means 85 for dividing the entire selectable set point temperature range 86 into frozen and non-frozen temperature ranges 88 and 90, respectively. The total available set point temperature range for refrigeration unit 10, as illustrated at 86 in FIG. 1A, may, for example, may be −20° F. to +80° F. (−29° C. to +27° C.). The frozen range 88 would run from the lowest end of the set point temperature range, e.g., −20° F. (−29° C.), up to and including +24° F. (−4.4° C.), for example. The non-frozen range 90 would then run from +25° F. (−3.9° C.) to the upper end of the set point range, e.g., +80° F. (+27° C.). Values UTLV and LTLV define the upper and lower temperature boundaries of a set point temperature range 92 in the non-frozen range 90 which is authorized for cycle mode. Temperature range 92 is the only temperature range in the non-frozen set point temperature range 90 which may be controlled via the cycle mode.

Values UTLV and LTLV are pre-selected by an authorized user of refrigeration system 10. As illustrated in FIG. 1A, unit 10 may be run in cycle mode only when the set point is in the frozen set point temperature range 88, and only when the set point is in the pre-authorized portion 92 of the non-frozen set point temperature range 90. Of course, refrigeration unit 10 may be operated in the continuous mode 72 for any set point temperature selection in the entire set point temperature range.

Parameter selection means 76 further includes means 80 which enables an authorized user of refrigeration unit 10 to select a minimum battery charging current value, from a predetermined range of battery charging current values, which minimum value must be reached in order to enable engine 14 to be stopped to enter a null cycle. The predetermined range of charging current values may be from 2 to 8 amperes, with a default value of 5 amperes, for example. Unless the battery charging current has been reduced to the pre-selected value, engine 14 will not be stopped when in cycle mode, even though the temperature of conditioned space has been reduced to set point SP. Controller 18 will switch refrigeration unit 10 between low speed cool (LSC) and low speed heat (LSH) to hold set point SP, similar to continuous mode operation, until the battery charging current has been reduced to the selected value. Thus, the stopping of engine 14 during cycle mode may be tailored to the actual age and/or condition of battery 26, taking into consideration current and/or expected ambient temperatures.

Parameter selection means 76 further includes means 82 which enables an authorized user of refrigeration unit 10 to select a minimum battery voltage value, from a predetermined range of battery voltage values, which minimum value must be reached in order for engine 14 to be started to terminate a null cycle solely because of low battery voltage. The predetermined range of battery voltage values may be from 12.0 to 12.6 volts, with a default value of 12.4 volts, for example. Unless the battery voltage has dropped to the pre-selected value during a null cycle, engine 14 will not be started to terminate a null cycle for low battery voltage. Thus, the starting of engine 14 during cycle mode may be tailored to the actual age and/or condition of battery 26, taking into consideration current and/or expected ambient temperatures.

The length of time refrigeration unit 10 is in the null cycle may be very long, especially when the ambient temperature is close to the selected set point temperature. When the load requires a certain amount of air flow, the invention allows authorized personnel to limit the duration of the null cycle, and thus provide a desired average air flow over the running and non-running null times. Parameter selector means 76 includes means 84 for selecting a maximum null cycle duration time, from a predetermined time range, such as 20 minutes to 60 minutes. Thus, the null cycle may be terminated: (1) when the temperature of conditioned space 46 reaches an upper or lower temperature limit of the null cycle; (2) by the voltage BV of battery 26 falling to the programmed value; (3) by the temperature WT of engine coolant 24 falling to a predetermined fixed value; and, (4) by the duration of the null cycle reaching a programmed value, insuring a minimum average air flow over and through the load in conditioned space 46.

As shown in the control algorithm 77 for the cycle mode in FIG. 5, the temperature of conditioned space 46 is driven down to the selected set point temperature SP by running engine 14 and by operating refrigeration unit 10 in the cooling mode. The temperature of conditioned space 46 normally then starts to rise, and when the temperature rises to a predetermined temperature UNL above set point SP, engine 14 is started and unit 10 is run in low speed cool (LSC) to drive the temperature of conditioned space 46 back to set point. The upper temperature limit UNL of the null cycle is normally fixed, or in some instances it may be automatically dynamically controlled in response to the ambient temperature, such as described in the hereinbefore mentioned U.S. Pat. No. 5,197,650. The present invention includes means 93 in the parameter selector means 76 which enables the upper temperature limit UNL of the null cycle to be selected from a predetermined range of values when the set point temperature SP is in frozen range 88 of the set point temperature range 86 shown in FIG. 1A. The range of upper limit values UNLV which may be selected from to provide the upper null temperature limit UNL may be from 5° F. to 20° F. (2.8° C. to 11° C.) above the set point temperature SP, with a default of 5° F. (2.8° C.). Thus, when the load carried in the conditioned space 46 is frozen, authorized personnel are able to select the upper temperature limit of the null cycle according to the type of load in conditioned space 46, as well as in response to other considerations, such as the ambient temperature.

FIG. 2 is a flow chart of a "guarded access" program 94 which implements a preferred embodiment of the parameter selection aspect of the invention, using interactive display 62. Parameter selection may be part of the "guarded access" function described in the hereinbefore mentioned U.S. Pat. No. 5,123,251, for example, which permits only authorized users of refrigeration unit 10 to select, implement, and/or change, predetermined features associated with refrigeration unit.

Guarded access program 94 is entered at 96 and step 98 determines if the proper user identification has been utilized. For example, to initiate the guarded access program 94 it may require that certain of the buttons on display 62, shown generally with reference 99, be actuated simultaneously. This may be an initial code level to initiate program 94, with step 98 requesting that the user then enter some higher level of code given only to authorized users, and changed periodically. Display 62 includes a portion 101 which prompts the user as to the next step of the interactive program. Step 100 determines if the user is authorized, and if not, program 94 exits at 102.

When step 100 finds the user is authorized, steps 104, 106 and 108 implement means 80 of the parameter selection means 76, with step 104 displaying the battery charging current value MBCCAV which is currently in effect. This value may be the default value of 5 amperes, or it may be a value between 2 and 8 amperes previously programmed by an authorized user. Step 106 asks the user if he wants to change the value displayed, and if so step 108 requests the user to enter the new value for MBCCAV. If the user finds that the currently selected value for MBCCAV is O.K., step 108 is skipped.

Step 108, and the "no" branch of step 106 both proceed to step 110, with steps 110, 112, and 114 implementing means 82 of the parameter selection means 76. Step 110 displays the minimum battery voltage value BRV which is currently in effect. This value may be the default value of 12.4 volts, or it may be a value from 12.0 to 12.6 volts previously programmed by an authorized user. Step 112 asks the user if he wants to change the value displayed, and if so step 114 requests the user to enter the new value for BRV. If the user finds that the currently selected value for BRV is O.K., step 114 is skipped.

Step 114 and the "no" branch of step 112 both proceed to step 116, with steps 116, 118, and 120 implementing means 78 of the parameter selection means 76. The operating range of cycle mode is programmed to prevent refrigeration unit 10 from going into a null cycle on selectable set point temperatures SP in the non-frozen temperature range 90 of FIG. 1A. The invention enables an authorized user to specify a temperature range in the non-frozen set point temperature range where cycle mode will be allowed or enabled. Cycle mode is prevented with a non-frozen load outside this authorized range. The reason for this is that some loads require continuous air flow, and this aspect of the invention will prevent such a load from accidentally being subjected to cycle mode operation.

Step 116 displays the current selections of the upper and lower temperature limits UTLV and LTLV, respectively, of the cycle mode authorized range. These limits may specify a temperature range of any desired magnitude anywhere the user desires in the non-frozen temperature range of +25° F. to +80° F. (−3.9° C. to 27° C.). Step 118 asks the user if a change is desired, and if so, step 120 directs the user to enter new values for UTLV and LTLV.

Step 120, and the "no" branch of step 118 proceed to step 122, with steps 122, 124 and 126 implementing means 84 of parameter selection means 76. Step 122 displays the current selection for maximum null cycle time MNTV. If no selection has been made, then the maximum time value, e.g., all 9's, would be displayed. Step 124 asks the user if the maximum null cycle time value MNTV should be changed, and if so, step 126 directs the user to enter a new MNTV value within predetermined limits, such as between 20 and 60 minutes.

Step 126, and the "no" branch of step 124 proceed to step 128, with steps 128, 130 and 132 implementing means 93 of the parameter selection means 76. Step 128 displays the current selection of the upper null cycle temperature limit UNLV for a frozen load, i.e., for set points in temperature range 88 of FIG. 1A. The selectable range is 5° F. to 20° F. (2.8° C. to 11° C.) above set point SP, with a default value of 5° F. (2.8° C.) above set point SP. This upper null cycle temperature limit is fixed for a non-frozen load, i.e., a set point SP in temperature range 90 of FIG. 1A, and may be 5° F. (2.8° C.) above set point SP, for example. Step 130 asks the user if the upper null cycle temperature limit value UNLV should be changed, and if so, step 132 directs the user to enter a new UNLV value. Step 132 and the "no" branch of step 130 both proceed to the program return or exit 134.

Figure 4A:
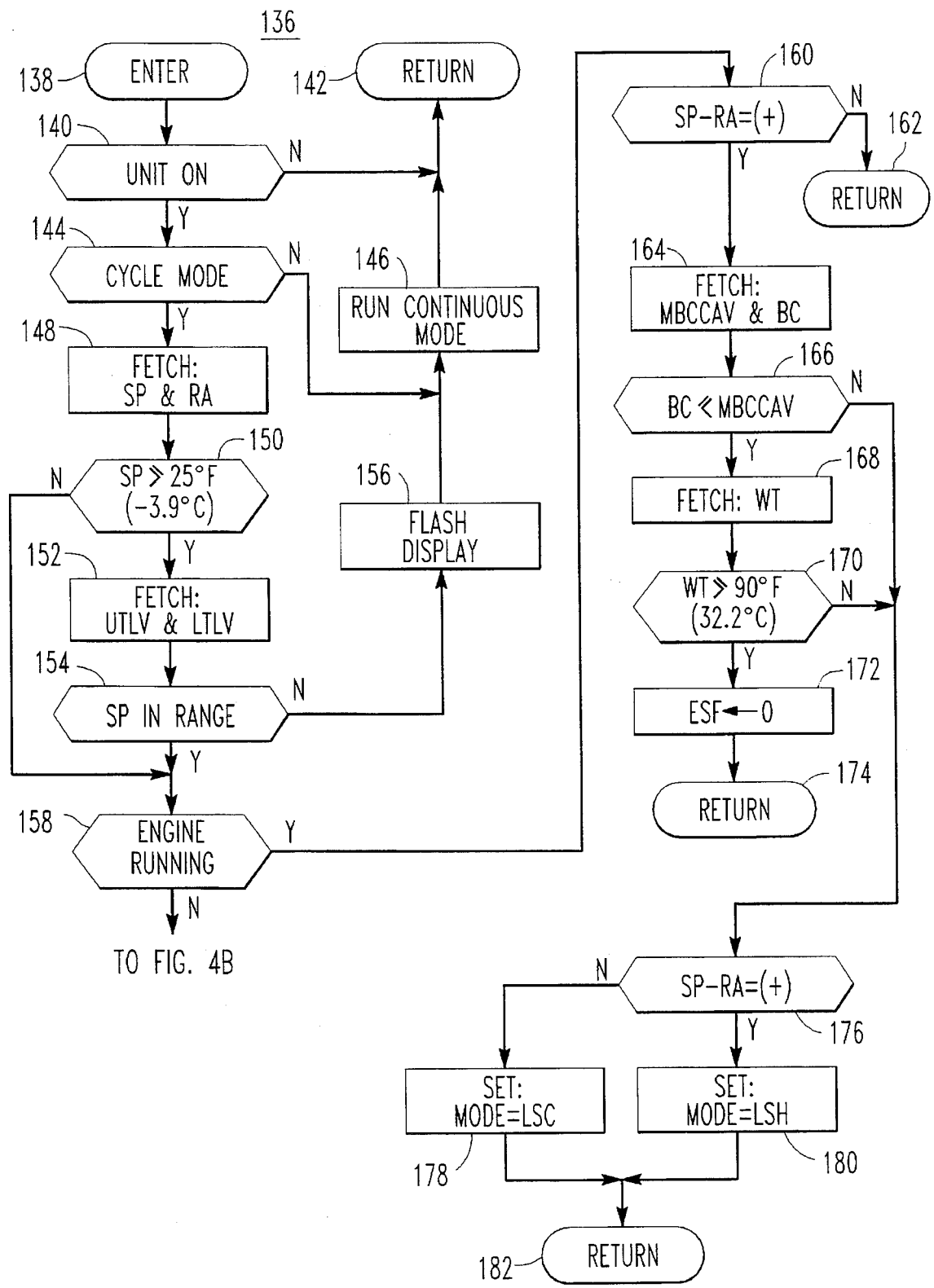

FIGS. 4A and 4B may be assembled to provide a flow chart of a program 136 which further implements the teachings of the invention relative to the cycle mode of operation. Program 136 is entered periodically at 138 and step 140 determines if the unit on/off switch 19 is in the "on" position. If switch 19 is in the "off" position, program 136 exits at 142, and program 136 will cycle through steps 138, 140 and 142 until switch 19 is found to be in the "on" position.

When step 140 finds unit 10 has been turned on, step 144 checks the operation mode selection switch 68 to determine which of the two modes, continuous or cycle, has been selected. If step 144 finds the continuous mode has been selected, this selection is never over-ridden and step 144 proceeds to step 146 which runs the continuous mode, following the control algorithm 75 of FIG. 6, for example. A detailed program for running the continuous mode is described in the hereinbefore mentioned U.S. Pat. No. 5,140,826. As long as the continuous operating mode is selected, program 136 cycles through steps 138, 140, 144, 146 and 142.

When step 144 finds that the cycle operating mode has been selected by switch 68, step 148 fetches the set point temperature SP, and a temperature indicative of the temperature of conditioned space 46, which for purposes of example will be assumed to the temperature RA of return air 44. Step 150 then determines if the set point temperature SP is in the frozen temperature range 88 or in the non-frozen temperature range 90 of the set point range 86 shown in FIG. 1A. When the set point temperature is found to be in the non-frozen range 90, step 152 fetches the upper and lower temperature limits UTLV and LTLV which define the boundaries of an authorized cycle mode temperature range in the non-frozen set point temperature range 90.

Step 154 determines if the set point temperature SP is in the pre-defined authorized range for cycle mode in the non-frozen set point temperature range 90. If no limit values UTLV and LTLV have been selected, or the set point temperature SP is not within the temperature range defined by limit values UTLV and LTLV, cycle mode is not authorized, and will not be run, notwithstanding the selection of cycle mode by mode selector switch 68. Step 156 proceeds to step 156 which flashes a warning light 103 on display 62 for a predetermined period of time, such as 30 seconds, to inform the user that cycle mode will not be run with the current selection of the set point SP temperature, and step 156 proceeds to step 146 to operate unit 10 in the continuous mode.

Step 154 proceeds to step 158 when the set point SP is in an authorized range of the non-frozen set point range 90. The "no" branch of step 150 also proceeds to step 158, with this branch indicating that the set point SP is in the frozen range 88, and therefore always allowed. Step 158 then determines if engine 14 is running, such as by checking an engine running flag. When step 158 finds engine 14 running, step 160 determines if the temperature of conditioned space 46 has been satisfied by reducing the temperature RA to set point SP. For example, step 160 may subtract the temperature RA from the set point temperature SP, and if the result is not positive, the temperature has not been satisfied and engine 14 is allowed to keep running by exiting program at 162.

When step 160 finds that the temperature of conditioned space 46 has been satisfied, step 164 fetches the actual battery charging current BC and the minimum battery charging value MBCCAV selected in step 108 of FIG. 2. Step 166 compares BC and MBCCAV to determine if the actual charging current BC has been reduced to, or below, the programmed minimum value MBCCAV. When step 166 finds that the battery charging current BC has been reduced to, or below, the programmed minimum value MBCCAV, it is O.K. to stop engine 14 from the battery viewpoint, and step 168 fetches the temperature WT of the engine coolant 24. Step 170 compares the temperature WT with some predetermined value, such as +90° F. (+32.2° C.). If the coolant temperature has reached, or exceeded, this predetermined value, it is O.K. to stop engine 14 and begin a null cycle, as the temperature of conditioned space 46 has been satisfied, the battery 26 has a sufficient charge to assure restarting of engine 14, and the temperature of the engine coolant 24 is also high enough to assure re-starting of engine 14. Step 170 thus proceeds to step 172 which sets an engine start flag ESF false, i.e., to logic zero, and program 136 exits at 174. An engine stopping program will then be run, which may, for example, de-energize a fuel solenoid valve, cutting off fuel to engine 14.

When step 166 finds that the battery charging current BC exceeds the programmed value MBCCAV, and when step 170 finds that the temperature WT of the engine coolant 24 has not reached the desired minimum value, engine 14 will not be stopped, even though the temperature of conditioned space 46 has been satisfied. The "no" branches of steps 166 and 170 both proceed to step 176 which determines if conditioned space 46 requires a cooling cycle or a heating cycle to maintain the selected set point temperature SP. When a cooling cycle is required, step 178 sets the refrigeration mode to low speed cool (LSC), and program 136 exits at 182. When a heating cycle is required, step 180 sets the refrigeration mode to low speed heat (LSH), and program 136 exits at 182. In the LSC mode, controller 18 de-energizes a speed selection solenoid which sets an engine throttle to a predetermined low speed position, such as 1400 RPM, and controller 18 sets the controllable refrigerant flow path valves to cause the hot refrigerant gas in hot gas line 36 to proceed through condenser coil 38, an expansion device, and then through evaporator coil 40. In the heating cycle, controller 18 may energize resistors, or a hot gas heating mode may be provided by connecting hot gas line 36 directly to the input of evaporator coil 40, as desired. Steps 176, 178 and 180 will cause unit 10 to cycle between cooling and heating cycles, with a predetermined hysteresis which may be factored into step 176, until engine 14 is in a condition which assures re-starting, at which point step 170 will advance to step 172 to initiate the stopping of engine 14.

When step 158 finds engine 158 is stopped, and therefore in a null cycle, step 158 proceeds to step 184 which determines if the selected set point temperature SP is in the frozen temperature range 88 or in the non-frozen temperature range 90. When step 184 finds the set point temperature SP in the frozen temperature range 88, step 186 determines if the temperature RA of the return air 44 is equal to, or greater than +29° F. (−1.7° C.). With a frozen load, a return air temperature RA of +29° F. (−1.7° C.), or higher, means that engine 14 should be re-started, without regard to any other factors, and upon finding this condition, step 186 proceeds to step 188 which resets a null timer flag NTF, it sets the refrigeration mode to low speed cool (LSC), and it sets the engine start flag ESF true, i.e., to a logic one. When engine start flag ESF is true, an engine start program, such as shown in detail in the hereinbefore mentioned U.S. Pat. No. 5,140,826, is run. Program 136 then exits at 190.

When step 186 finds that the temperature of the return air is below +29° F. (−1.7° C.) step 192 fetches the programmed upper temperature limit UNLV for the null cycle. Step 194 determines if the temperature RA of the return air 44 has reached this upper temperature of the null cycle above set point SP, and if it has, step 194 proceeds to step 188, to re-start engine 14.

When step 184 finds the set point temperature SP has been set in the non-frozen range 90 of the set point temperature range, step 196 determines if the temperature of the return air has reached the fixed upper temperature limit of 5° F. (2.8° C.) above set point SP. If the temperature RA of the return air 44 has reached this upper limit of the null cycle, step 196 proceeds to step 188, to restart engine 14.

When step 196 finds that the temperature of conditioned space 46 is still within the temperature limits of the null cycle, step 196 proceeds to step 198, as does step 194 when step 194 finds the temperature of conditioned space 46 satisfied. Step 198 checks a null timer flag NTF to see if a null cycle timer NT has been started during a previous running of program 136. If null timer NT has not been started, step 200 sets flag NTF to a logic one, and the null timer NT is zeroed. Step 202 then updates null timer NT, and fetches the programmed maximum null time value MNTV selected in step 126 of FIG. 2. The programmed maximum null time value MNTV may be all 9's, when no maximum null time has been specified, or it may be some selected value between 20 and 60 minutes. When step 198 finds flag NTF set, it proceeds directly to step 202 to update null timer NT. Step 204 compares the updated value of null timer NT with the programmed maximum value MNTV. When step 204 finds the null timer NT has reached or exceeded the programmed maximum value MNTV, step 204 proceeds to step 188 to initiate re-starting of engine 14.

When step 204 finds that the maximum null time value

MNTV has not been reached, program 136 then determines if engine 14 should be re-started for some other reason, such as for low battery voltage, or low engine coolant temperature. Step 206 fetches the actual battery voltage BV and the programmed minimum battery voltage BRV selected in step 114 of FIG. 2. Step 208 compares BV with BRV, and if the battery voltage BV has dropped to, or below the programmed minimum value BRV, step 208 proceeds to step 188 to initiate restarting of engine 14. When step 208 finds the battery voltage BV above the programmed minimum value BRV, step 210 fetches the temperature WT of the engine coolant 24. Step 212 compares temperature WT with some predetermined fixed minimum value, such as +30° F. (−1.1° C.). When step 212 finds that the temperature WT of the engine coolant 24 has dropped to, or below this minimum temperature value, step 212 proceeds to step 188, to restart engine. When step 212 finds that the temperature WT is above the predetermined value, it is O.K. to remain in the null cycle, as the temperature of conditioned space 46 is satisfied, i.e., within the temperature limits of the null cycle, the battery voltage BV is above the programmed minimum value BRV, and the temperature WT of the engine coolant 24 is above a predetermined minimum value. Step 212 then exits program 136 at 214.

We claim:

1. A method of operating a refrigeration unit having a compressor driven by a prime mover in a cycle mode which includes a cooling cycle and a null cycle, to control the temperature of a conditioned space relative to a selected set point temperature, comprising the steps of:

dividing the set point temperature range of the conditioned space into frozen and non-frozen temperature ranges, selecting a value from a predetermined range of values which selects an upper temperature limit value of the null cycle, running the prime mover to provide the cooling cycle, to reduce the temperature of the conditioned space, monitoring the temperature of the conditioned space during the cooling cycle, comparing the temperature of the conditioned space with a predetermined temperature value which is higher than the set point temperature, when the set point temperature is in the frozen temperature range, stopping the prime mover to initiate the null cycle when the comparison step finds the temperature of the conditioned space has a predetermined relationship with the set point temperature, monitoring the temperature of the conditioned space during the null cycle, comparing the temperature of the conditioned space during the null cycle with the selected upper temperature limit of the null cycle, and starting the prime mover when the comparison step finds that the temperature of conditioned space has risen to the selected upper temperature limit of the null cycle.

2. The method of claim 1 including the step of:

starting the prime mover when the temperature of the conditioned space rises to the predetermined temperature value, regardless of the magnitude of the value selected by the selecting step as the upper limit of the null cycle.

3. A method of operating a refrigeration unit having a compressor driven by a prime mover in a cycle mode which includes a cooling cycle and a null cycle, to control the temperature of a conditioned space relative to a selected set point temperature, comprising the steps of:

selecting a value from a predetermined range of values which selects a maximum time duration for a null cycle, running the prime mover to provide the cooling cycle, to reduce the temperature of the conditioned space, monitoring the temperature of the conditioned space, comparing the temperature of the conditioned space with the set point temperature, stopping the prime mover when the temperature of the conditioned space has a predetermined relationship with the set point temperature, timing the duration of the null cycle, comparing the timed duration of the null cycle with the selected maximum time duration, monitoring the temperature of the conditioned space during a null cycle, comparing the temperature of the conditioned space during the null cycle with a predetermined upper temperature limit of the null cycle, and starting the prime mover in response to the duration of the null cycle reaching the selected maximum time duration, and in response to the temperature of the conditioned space rising to the upper temperature limit of the null cycle, which ever occurs first.

4. A refrigeration unit having a compressor driven by a prime mover in a cycle mode which includes a cooling cycle and a null cycle, to control the temperature of a conditioned space relative to a selected set point temperature, comprising:

means dividing the set point temperature range of the conditioned space into frozen and non-frozen temperature ranges, means for selecting a value from a predetermined range of values which selects an upper temperature limit value of the null cycle, means for starting the prime mover and operating the refrigeration unit to provide the cooling cycle, to reduce the temperature of the conditioned space, temperature sensor means monitoring the temperature of the conditioned space, first comparator means for comparing the temperature of the conditioned space during the cooling cycle with the set point temperature, means for stopping the prime mover to initiate the null cycle when the first comparator means finds the temperature of the conditioned space has a predetermined relationship with the set point temperature, second comparator means for comparing the temperature of the conditioned space during the null cycle with the selected upper temperature limit value of the null cycle, means for comparing the temperature of the conditioned space with a predetermined temperature value which is higher than the set point temperature, when the set point temperature is in the frozen temperature range, and starting means for starting the prime mover when the second comparator means finds that the temperature of conditioned space has risen to the selected upper temperature limit value of the null cycle.

5. The refrigeration unit of claim 4 wherein said starting means starts the prime mover when the temperature of the conditioned space rises to the predetermined temperature value, regardless of the magnitude of the value selected by the selecting means as the upper limit of the null cycle.

6. A refrigeration unit having a compressor driven by a prime mover in a cycle mode which includes a cooling cycle and a null cycle, to control the temperature of a conditioned space relative to a selected set point temperature, comprising:

- means for selecting a value from a predetermined range of values which selects a maximum time duration value for a null cycle,
- starting means for starting and running the prime mover to reduce the temperature of the conditioned space,
- temperature sensor means for monitoring the temperature of the conditioned space,
- first comparator means for comparing the falling temperature of the conditioned space with the set point temperature,
- stopping means for stopping the prime mover when the first comparator means finds the temperature of the conditioned space has a predetermined relationship with the set point temperature,
- means for timing the duration of the null cycle,
- second comparator means for comparing the timed duration of the null cycle with selected maximum time duration value,
- and third comparator means for comparing the temperature of the conditioned space during the null cycle with a predetermined upper temperature limit value of the null cycle,
- said starting means starting the prime mover in response to the second comparator means finding duration of the null cycle has reached the selected maximum time duration value, and in response to the third comparator means finding the temperature of the conditioned space rising to the upper temperature limit value of the null cycle, which ever occurs first.

* * * * *